US012641146B2

(12) United States Patent
Mey-Tal et al.

(10) Patent No.: US 12,641,146 B2
(45) Date of Patent: May 26, 2026

(54) ENHANCED ROUTING PERFORMANCE

(71) Applicant: MELLANOX TECHNOLOGIES, LTD., Yokneam (IL)

(72) Inventors: Gil Mey-Tal, Tel Aviv (IL); Eran Gil Beracha, Tel Aviv (IL); Tal Mund, Herzliya (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 25 days.

(21) Appl. No.: 18/785,336

(22) Filed: Jul. 26, 2024

(65) Prior Publication Data

US 2026/0032172 A1     Jan. 29, 2026

(51) Int. Cl.
| | |
|---|---|
| *H04L 45/00* | (2022.01) |
| *H04L 43/0805* | (2022.01) |
| *H04L 47/62* | (2022.01) |
| *H04L 67/1017* | (2022.01) |

(52) U.S. Cl.
CPC ...... *H04L 67/1017* (2013.01); *H04L 43/0805* (2013.01); *H04L 45/22* (2013.01); *H04L 47/6225* (2013.01)

(58) Field of Classification Search
None
See application file for complete search history.

(56) References Cited

U.S. PATENT DOCUMENTS

| | | | | |
|---|---|---|---|---|
| 2007/0094361 A1* | 4/2007 | Hoynowski | ......... | H04L 67/1001 714/E11.141 |
| 2010/0124196 A1* | 5/2010 | Bonar | ................ | H04B 7/0689 455/445 |
| 2012/0155628 A1* | 6/2012 | Booth | .............. | H04M 15/8044 379/221.05 |
| 2012/0166639 A1* | 6/2012 | Hoynowski | ......... | H04L 61/4511 709/224 |
| 2015/0113164 A1* | 4/2015 | Butler | .................... | H04L 41/50 709/239 |
| 2015/0304504 A1* | 10/2015 | McGuigan | ............ | H04M 15/00 370/352 |
| 2016/0065447 A1* | 3/2016 | Khan | ..................... | H04L 45/22 370/237 |
| 2017/0048144 A1* | 2/2017 | Liu | ........................ | H04L 47/122 |
| 2018/0234336 A1* | 8/2018 | Schumm | ............... | H04L 45/745 |
| 2024/0250897 A1* | 7/2024 | Oprea | .................... | H04L 45/28 |

* cited by examiner

*Primary Examiner* — Joshua Joo
(74) *Attorney, Agent, or Firm* — Sheridan Ross P.C.

(57) ABSTRACT

Embodiments of the present disclosure are directed to network devices utilizing different types of routing. More specifically, embodiments are directed to preventing the synchronization of routing engines such as can happen with routing types such as round robin. According to one embodiment, a network device can utilize a first routing type, e.g., round robin routing, as a primary routing type but can first check whether the selected port is currently available. If the selected port is not available, rather than continue with the first routing type approach, a port can be selected utilizing a second, different type of routing such as random or pseudo-random routing.

20 Claims, 4 Drawing Sheets

ENHANCED ROUTING PERFORMANCE

FIELD OF THE DISCLOSURE

The present disclosure is generally directed to network devices and more particularly to network devices utilizing different types of routing.

BACKGROUND

Round robin routing is a technique used for routing packets across a communication network. Switches, routers, or other communication network devices route data packets to communication ports one after another following a pre-defined list of ports. For devices having a large number of ports and handling a high volume of data packets, the round robin engines of such devices can become synchronized over time as the various ports dynamically become available and unavailable. This problem, referred to as "herding," reduces the performance of the switch as the routing engines begin to utilize the same ports at or near the same time.

BRIEF SUMMARY

Embodiments of the present disclosure are directed to network devices utilizing different types of routing. More specifically, embodiments are directed to preventing the synchronization of routing engines such as can happen with routing types such as round robin. According to one embodiment, a network device can utilize a first routing type, e.g., round robin routing, as a primary routing type but can first check whether the selected port is currently available. If the selected port is not available, rather than continue with the first routing type approach, a port can be selected utilizing a second, different type of routing such as random or pseudo-random routing.

According to one embodiment, a communication device can comprise a plurality of communication ports and a control circuit controlling operation of the communication device which can cause the communication device to select a communication port from a first list of communication ports using a first routing type. The first list of communication ports can comprise a list of all of the plurality of communication ports. The control circuit can further cause the communication device to determine whether the selected communication port from the first list of communication ports is currently available based on a second list of communication ports. The second list of communication ports can comprise a dynamically determined list of available communication ports of the plurality of communication ports. In response to determining the selected communication port from the first list of communication ports is currently available, the control circuit can further cause the communication device to route a data packet to the selected communication port from the first list of communication ports. In response to determining the selected communication port from the first list of communication ports is not currently available, the control circuit can further cause the communication device to route the data packet to using a second routing type and the second list of communication ports.

According to one aspect, the first routing type can comprise round robin routing. According to one aspect, the second routing type can comprise pseudo-random routing.

According to one aspect, the pseudo-random routing can be based on a Linear Feedback Shift Register (LFSR) of the communication device.

According to one aspect, the round robin routing can comprise a weighted round robin routing.

According to one aspect, each communication port of the plurality of communication ports can comprise an egress queue and a weight applied to each communication port by the weighted round robin routing can be based on a status of the egress queue for the communication port.

According to one aspect, each communication port of the plurality of communication ports can comprise an egress queue and the communication ports of the second list of communication ports can be dynamically determined based on a status of the egress queue of each of the plurality of communication ports.

According to another embodiment, a system can comprise a communication network and a communication device coupled with the communication network. The communication device can comprise a plurality of communication ports and a control circuit controlling operation of the communication device which can cause the communication device to select a communication port from a first list of communication ports using a first routing type. The first list of communication ports can comprise a list of all of the plurality of communication ports. The control circuit can further cause the communication device to determine whether the selected communication port from the first list of communication ports is currently available based on a second list of communication ports. The second list of communication ports can comprise a dynamically determined list of available communication ports of the plurality of communication ports. In response to determining the selected communication port from the first list of communication ports is currently available, the control circuit can further cause the communication device to route a data packet to the selected communication port from the first list of communication ports. In response to determining the selected communication port from the first list of communication ports is not currently available, the control circuit can further cause the communication device to route the data packet to using a second routing type and the second list of communication ports.

According to one aspect, the first routing type can comprise round robin routing.

According to one aspect, the second routing type can comprise pseudo-random routing.

According to one aspect, the pseudo-random routing can be based on a Linear Feedback Shift Register (LFSR) of the communication device.

According to one aspect, the round robin routing can comprise a weighted round robin routing.

According to one aspect, each communication port of the plurality of communication ports can comprise an egress queue and a weight applied to each communication port by the weighted round robin routing can be based on a status of the egress queue for the communication port.

According to one aspect, each communication port of the plurality of communication ports can comprise an egress queue and the communication ports of the second list of communication ports can be dynamically determined based on a status of the egress queue of each of the plurality of communication ports.

According to yet another embodiment, a method for routing packets in a communication device can comprise selecting a communication port from a first list of communication ports using a first routing type. The first list of communication ports can comprise a list of all of a plurality of communication ports in the communication device. A determination can be made as to whether the selected communication port from the first list of communication ports is currently available based on a second list of communication ports. The second list of communication ports can comprise a dynamically determined list of available communication ports of the plurality of communication ports, wherein each communication port of the plurality of communication ports can comprise an egress queue, and wherein the communication ports of the second list of communication ports can be dynamically determined based on a status of the egress queue of each of the plurality of communication ports. In response to determining the selected communication port from the first list of communication ports is currently available, a data packet can be routed to the selected communication port from the first list of communication ports. In response to determining the selected communication port from the first list of communication ports is not currently available, the data packet can be routed to using a second routing type and the second list of communication ports.

According to one aspect, the first routing type can comprise round robin routing.

According to one aspect, the second routing type can comprise pseudo-random routing.

According to one aspect, the pseudo-random routing can be based on a Linear Feedback Shift Register (LFSR) of the communication device.

According to one aspect, the round robin routing can comprise a weighted round robin routing.

According to one aspect, each communication port of the plurality of communication ports can comprise an egress queue and a weight applied to each communication port by the weighted round robin routing can be based on a status of the egress queue for the communication port.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
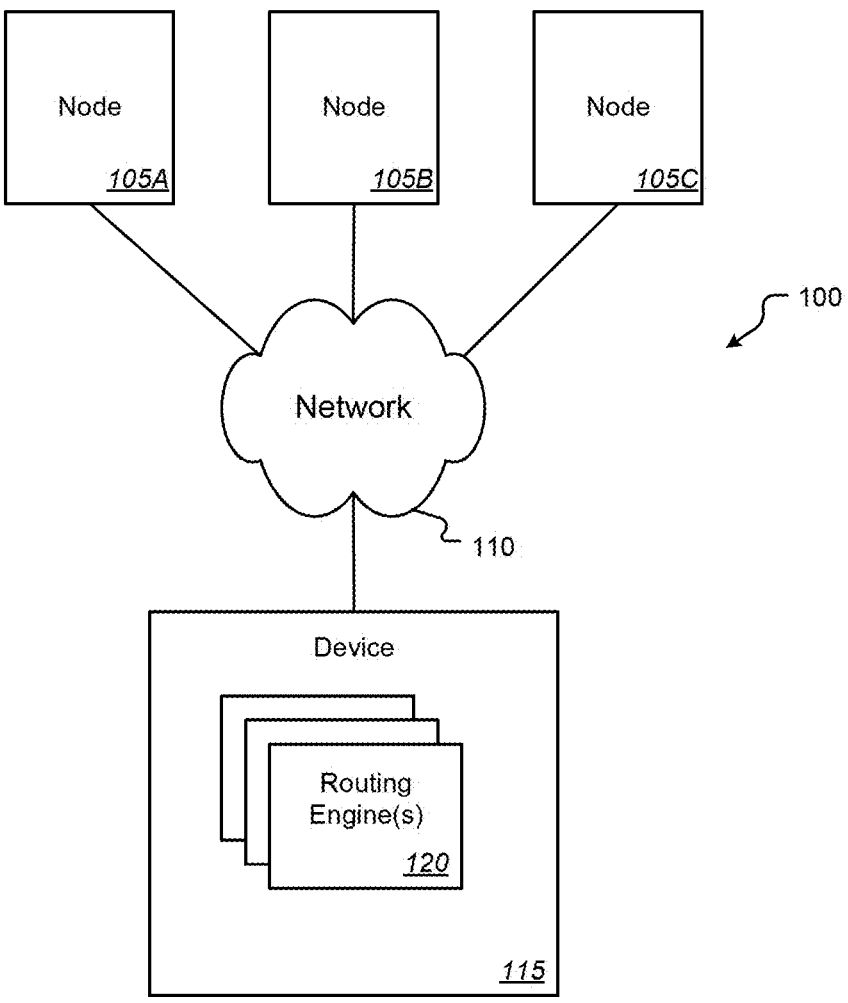
FIG. 1 is a block diagram illustrating an exemplary environment in which embodiments of the present disclosure may be implemented.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not to be deemed "material."

The terms "determine," "calculate," and "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-4, various systems and methods for routing of data packets in communications networks will be described. Embodiments of the present disclosure are directed to network devices utilizing different types of routing. More specifically, embodiments are directed to preventing the synchronization of routing engines such as can happen with routing types such as round robin. According to one embodiment, a network device can utilize a first routing type, e.g., round robin routing, as a primary routing type but can first check whether the selected port is currently available. If the selected port is not available, rather than continue with the first routing type approach, a port can be selected utilizing a second, different type of routing such as random or pseudo-random routing.

FIG. 1 is a block diagram illustrating an exemplary environment in which embodiments of the present disclosure may be implemented. As illustrated in this example, the environment can comprise any number of nodes 105A-105C coupled with a communication network 110. Each node 105A-105C can comprise, for example, a server or other computing device as known in the art. The communication network 110 can comprise any number of wired and/or wireless, local-area and/or wide-area networks as known in the art.

Also coupled with the communication network 110 can be a network device 115. Generally speaking, the network device 115 can receive data packets transmitted from the nodes 105A-105C and route the data packets to an intended destination over the communication network 110. To do so, the device 115 can utilize a number of routing engines 120 and 125.

The routing engines 120 and 125 can perform routing of data packets across the network 110 and between the nodes 105A-105C using any of a variety of routing algorithms. For example, random routing and round robin routing algorithms are commonly employed for route selection. However, to ensure load balance, a control circle is introduced to remove busy routes, thereby enabling smart management of network routing. While both methods aim to optimize load distribution, each has its drawbacks. For example, random selection exhibits higher variance due to reliance on the control loop for correction, which can be problematic in environments where the control loop is slow or unreliable, giving round robin an advantage. However, frequent addition and removal of paths may lead to synchronization among flows employing round robin, resulting in a herd effect.

Embodiments of the present disclosure are directed to the challenge of multiple individual flows employing a "round robin from best" approach on dynamically changing path groups, where synchronization among flows may occur due to imperfect control circuitry and shared state information. Generally speaking, packets in each flow can be routed initially using a first type of routing, e.g., the round robin routing method, without changes. When the initially selected route is unavailable, the route can be changed using a second, different type of routing, e.g., random or pseudo-random routing.

More specifically, each routing engine 120 can have two lists of paths. This can include an initial list of all available paths or routes. Another list can be a dynamic list which includes the initial routes but without busy or unavailable routes. Each routing engine 120 can have a pointer in the initial list for the round robin and the first route can be chosen randomly from the initial list. For each packet decision the flow pointer will advance to the next route of the initial list by one. In other words, routing is performed in round robin fashion based on the first list. If the pointer points to a route that is in the dynamic list, i.e., the route is available, this route can be used. However, if the pointer points to a route that is not in the dynamic list, i.e., the route is not available, the route can be selected from those in the dynamic list, e.g., randomly or pseudo-randomly. In this way, the routing engines 120 are prevented from synchronizing with each other because they will continue round robin routing according to the starting point regardless of the dynamic list changes.

According to one embodiment, the second list can be implemented as a mask of the first list. In this embodiment, the second list can comprise a binary representation of availability of each path in the first list. For example, a "1" can indicate availability of the corresponding path in the first list and a "0" can indicate unavailability. In this example, when the pointer for the first list points to a path marked with a "1" in the second list, routing can be done based on round robin. However, if the pointer points to a path marked with a "0" in the second list, routing can be performed randomly or pseudo-randomly.

Figure 2:
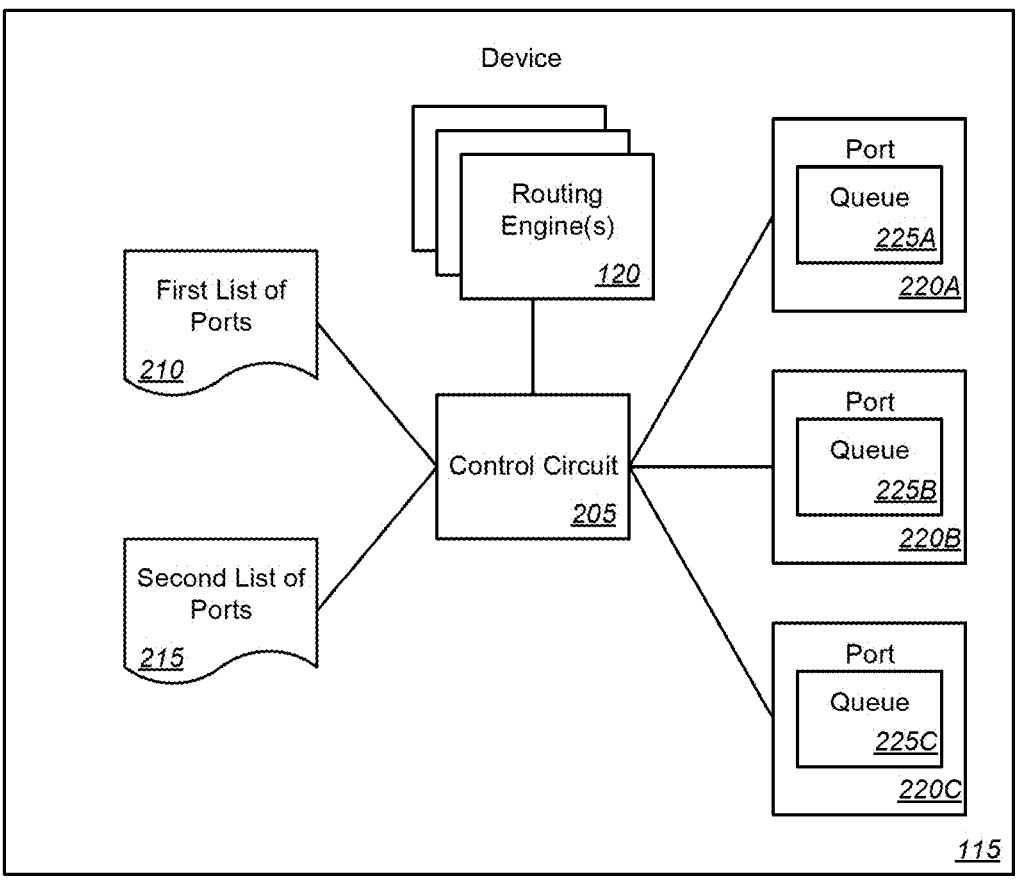
FIG. 2 is a block diagram illustrating additional details of an exemplary network device according to one embodiment of the present disclosure.

FIG. 2 is a block diagram illustrating additional details of an exemplary network device according to one embodiment of the present disclosure. As illustrated in this example, the communication device 115 can comprise a plurality of communication ports 220A-220C and a control circuit 205 controlling operation of the communication device 115. The control circuit 205 can comprise a Central Processing Unit (CPU), e.g., one or more microprocessors, as known in the art. The control circuit 205 can cause the communication device 115 to maintain a first list 205 of communication ports comprising all of the plurality of communication ports 220A-220C and a second list 215 of communication ports comprising a dynamically determined list of available communication ports of the plurality of communication ports 220A-220C. For example, each communication port of the plurality of communication ports 220A-220C can comprise an egress queue 225A-225C and the communication ports of the second list 215 of communication ports can be dynamically determined based on a status of the egress queue 225A-225C of each of the plurality of communication ports 220A-220C.

The control circuit 205 can further cause the communication device 115 to select a communication port from the first list 210 of communication ports using a first routing type and determine whether the selected communication port from the first list 210 of communication ports is currently available based on the second list 215 of communication ports. In response to determining the selected communication port from the first list of communication ports is currently available, the control circuit 205 can cause the communication device 115 to route a data packet to the selected communication port from the first list 210 of communication ports. In response to determining the selected communication port from the first list 210 of communication ports is not currently available, the control circuit 205 can cause the communication device 115 to route the data packet to using a second routing type and the second list 215 of communication ports.

For example, the first routing type can comprise round robin routing or weighted round robin routing. If weighted round robin routing is used, a weight applied to each communication port by the weighted round robin routing can be based on a status of the egress queue 225A-225C for the communication port 220A-220C. The second routing type can comprise, for example, a pseudo-random routing such as based on a Linear Feedback Shift Register (LFSR) or other randomizer.

Figure 3:
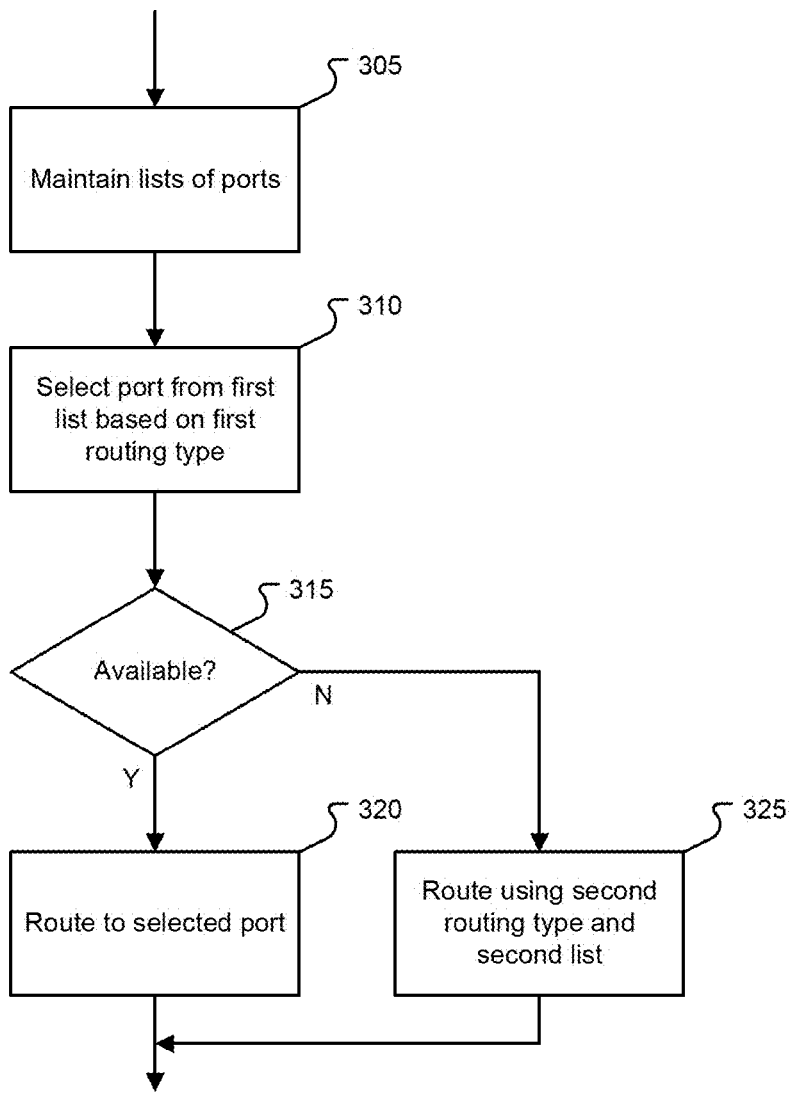
FIG. 3 is a flowchart illustrating an exemplary process for routing packets according to one embodiment of the present disclosure.

FIG. 3 is a flowchart illustrating an exemplary process for routing packets according to one embodiment of the present disclosure. As illustrated in this example, routing packets in a communication device 115 can comprise maintaining 305 a first list 210 of communication ports comprising all of a plurality of communication ports 220A-220C of the communication device 115 and a second list 215 of communication ports comprising a dynamically determined list of available communication ports of the plurality of communication ports 220A-220C. For example, each communication port of the plurality of communication ports 220A-220C can comprise an egress queue 225A-225C and the communication ports of the second list of communication ports can be dynamically determined based on a status of the egress queue 225A-225C of each of the plurality of communication ports 220A-220C.

A communication port can be selected 310 from the first list 210 of communication ports using a first routing type. A determination 315 can be made as to whether the selected 310 communication port from the first list 210 of communication ports is currently available based on the second list 215 of communication ports. In response to determining 315 the selected 310 communication port from the first list 210 of communication ports is currently available, a data packet can be routed 320 to the selected 310 communication port from the first list 210 of communication ports. In response to determining 315 the selected 310 communication port from the first list 210 of communication ports is not currently available, the data packet can be routed 325 using a second routing type and the second list 210 of communication ports.

Figure 4:
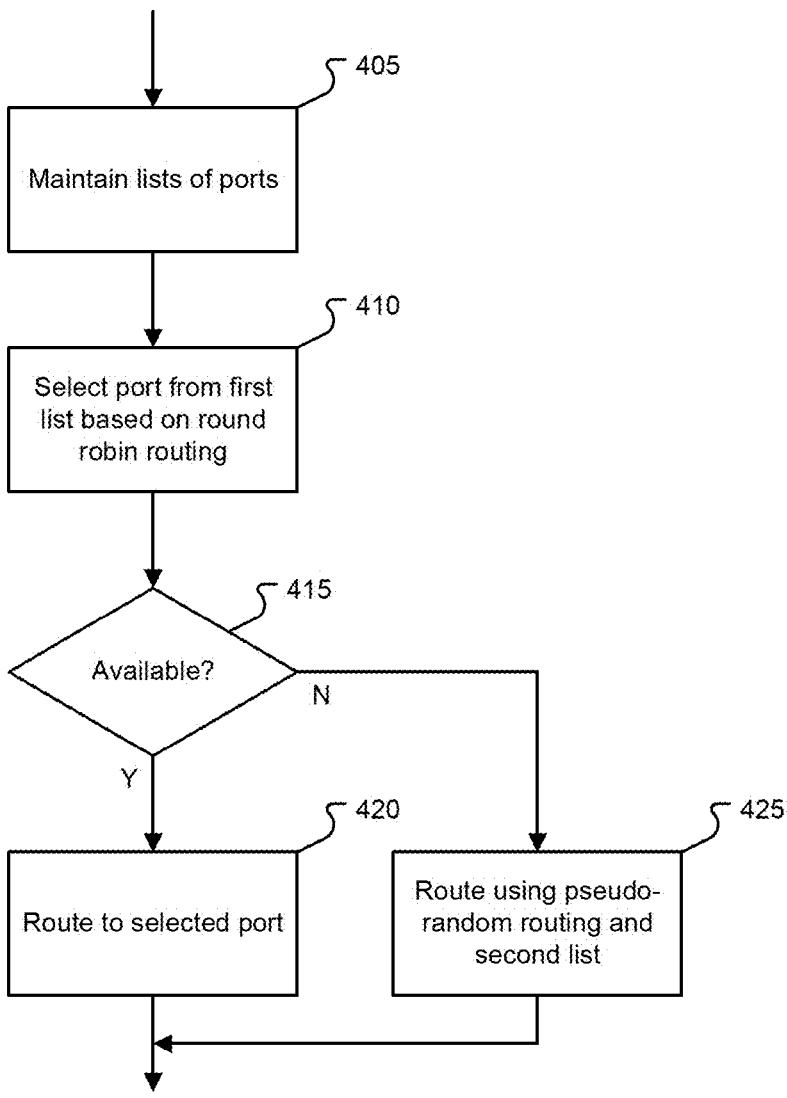
FIG. 4 is a flowchart illustrating an exemplary process for routing packets according to another embodiment of the present disclosure.

FIG. 4 is a flowchart illustrating an exemplary process for routing packets according to another embodiment of the present disclosure. As illustrated in this example, routing packets in a communication device 115 can comprise maintaining 405 a first list 210 of communication ports comprising all of a plurality of communication ports 220A-220C of the communication device 115 and a second list 215 of communication ports comprising a dynamically determined list of available communication ports of the plurality of communication ports 220A-220C. For example, each communication port of the plurality of communication ports 220A-220C can comprise an egress queue 225A-225C and the communication ports of the second list of communication ports can be dynamically determined based on a status of the egress queue 225A-225C of each of the plurality of communication ports 220A-220C.

A communication port can be selected 410 from the first list 210 of communication ports using a round robin or weighted round robin algorithm. If weighted round robin routing is used, a weight applied to each communication port by the weighted round robin routing can be based on a status of the egress queue 225A-225C for the communication port 220A-220C. A determination 415 can be made as to whether the selected 410 communication port from the first list 210 of communication ports is currently available based on the second list 215 of communication ports. In response to determining 415 the selected 410 communication port from the first list 210 of communication ports is currently available, a data packet can be routed 420 to the selected 410 communication port from the first list 210 of communication ports. In response to determining 415 the selected 410 communication port from the first list 210 of communication ports is not currently available, the data packet can be routed 425 using a random or pseudo-random routing algorithm and the second list 210 of communication ports. The random or pseudo-random routing can be based on a LFSR or other randomizer.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving case and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A communication device comprising:
   a plurality of communication ports;
   a control circuit controlling operation of the communication device, wherein the control circuit causes the communication device to:
      select a communication port from a first list of communication ports using a first routing type, the first list of communication ports comprising a list of all of the plurality of communication ports;
      determine whether the selected communication port from the first list of communication ports is currently available based on a second list of communication ports, the second list of communication ports comprising a dynamically determined list of available communication ports of the plurality of communication ports;
      in response to determining the selected communication port from the first list of communication ports is currently available, route a data packet to the selected communication port from the first list of communication ports; and
      in response to determining the selected communication port from the first list of communication ports is not currently available, route the data packet to an available communication port of the second list using a second routing type and the second list of communication ports.

2. The communication device of claim 1, wherein the first routing type comprises round robin routing.

3. The communication device of claim 2, wherein the second routing type comprises pseudo-random routing.

4. The communication device of claim 3, wherein the pseudo-random routing is based on a Linear Feedback Shift Register (LFSR) of the communication device.

5. The communication device of claim 2, wherein the round robin routing comprises a weighted round robin routing.

6. The communication device of claim 5, wherein each communication port of the plurality of communication ports comprises an egress queue and wherein a weight applied to each communication port by the weighted round robin routing is based on a status of the egress queue for the communication port.

7. The communication device of claim 1, wherein each communication port of the plurality of communication ports comprises an egress queue and wherein the communication ports of the second list of communication ports is dynamically determined based on a status of the egress queue of each of the plurality of communication ports.

8. A system comprising:
a communication network; and
a communication device coupled with the communication network, the communication device comprising:
    a plurality of communication ports, each communication port of the plurality of communication ports couple with the communication network;
    a control circuit controlling operation of the communication device, wherein the control circuit causes the communication device to:
        select a communication port from a first list of communication ports using a first routing type, the first list of communication ports comprising a list of all of the plurality of communication ports;
        determine whether the selected communication port from the first list of communication ports is currently available based on a second list of communication ports, the second list of communication ports comprising a dynamically determined list of available communication ports of the plurality of communication ports;
        in response to determining the selected communication port from the first list of communication ports is currently available, route a data packet to the selected communication port from the first list of communication ports; and
        in response to determining the selected communication port from the first list of communication ports is not currently available, route the data packet to an available communication port of the second list using a second routing type and the second list of communication ports.

9. The system of claim 8, wherein the first routing type comprises round robin routing.

10. The system of claim 9, wherein the second routing type comprises pseudo-random routing.

11. The system of claim 10, wherein the pseudo-random routing is based on a Linear Feedback Shift Register (LFSR) of the communication device.

12. The system of claim 9, wherein the round robin routing comprises a weighted round robin routing.

13. The system of claim 12, wherein each communication port of the plurality of communication ports comprises an egress queue and wherein a weight applied to each communication port by the weighted round robin routing is based on a status of the egress queue for the communication port.

14. The system of claim 8, wherein each communication port of the plurality of communication ports comprises an egress queue and wherein the communication ports of the second list of communication ports is dynamically determined based on a status of the egress queue of each of the plurality of communication ports.

15. A method for routing packets in a communication device, the method comprising:
    selecting, by a control circuit of the communication device, a communication port from a first list of communication ports using a first routing type, the first list of communication ports comprising a list of all of a plurality of communication ports in the communication device;
    determining, by the control circuit of the communication device, whether the selected communication port from the first list of communication ports is currently available based on a second list of communication ports, the second list of communication ports comprising a dynamically determined list of available communication ports of the plurality of communication ports, wherein each communication port of the plurality of communication ports comprises an egress queue, and wherein the communication ports of the second list of communication ports is dynamically determined based on a status of the egress queue of each of the plurality of communication ports;
    in response to determining the selected communication port from the first list of communication ports is currently available, routing, by the control circuit of the communication device, a data packet to the selected communication port from the first list of communication ports; and
    in response to determining the selected communication port from the first list of communication ports is not currently available, routing, by the control circuit of the communication device, the data packet to an available communication port of the second list using a second routing type and the second list of communication ports.

16. The method of claim 15, wherein the first routing type comprises round robin routing.

17. The method of claim 16, wherein the second routing type comprises pseudo-random routing.

18. The method of claim 17, wherein the pseudo-random routing is based on a Linear Feedback Shift Register (LFSR) of the communication device.

19. The method of claim 16, wherein the round robin routing comprises a weighted round robin routing.

20. The method of claim 19, wherein each communication port of the plurality of communication ports comprises an egress queue and wherein a weight applied to each communication port by the weighted round robin routing is based on a status of the egress queue for the communication port.

* * * * *